(12) United States Patent
Dobschal et al.

(10) Patent No.: US 12,099,188 B2
(45) Date of Patent: Sep. 24, 2024

(54) OPTICAL SYSTEM FOR GENERATING A VIRTUAL IMAGE, AND SMARTGLASSES

(71) Applicant: tooz technologies GmbH, Aalen (DE)

(72) Inventors: Hans-Juergen Dobschal, Kleinromstedt (DE); Matthias Hillenbrand, Jena (DE)

(73) Assignee: tooz technologies GmbH, Aalen (DE)

( * ) Notice: Subject to any disclaimer, the term of this patent is extended or adjusted under 35 U.S.C. 154(b) by 584 days.

(21) Appl. No.: 17/437,374

(22) PCT Filed: Feb. 26, 2020

(86) PCT No.: PCT/EP2020/055052
§ 371 (c)(1),
(2) Date: Sep. 8, 2021

(87) PCT Pub. No.: WO2020/182472
PCT Pub. Date: Sep. 17, 2020

(65) Prior Publication Data
US 2022/0350145 A1   Nov. 3, 2022

(30) Foreign Application Priority Data
Mar. 8, 2019   (DE) .................... 10 2019 106 020.6

(51) Int. Cl.
*G02B 27/01* (2006.01)
*G02B 5/10* (2006.01)

(52) U.S. Cl.
CPC ........... *G02B 27/0172* (2013.01); *G02B 5/10* (2013.01); *G02B 2027/0123* (2013.01)

(58) Field of Classification Search
CPC .. G02B 27/01; G02B 27/0101; G02B 27/017; G02B 27/0172; G02B 27/0178;
(Continued)

(56) References Cited

U.S. PATENT DOCUMENTS

| 8,189,263 B1 | 5/2012 | Wang et al. |
| 2010/0149073 A1 | 6/2010 | Chaum et al. |

(Continued)

FOREIGN PATENT DOCUMENTS

| CA | 2197175 A1 | 2/1996 |
| DE | 102014118490 A1 | 6/2016 |

(Continued)

OTHER PUBLICATIONS

International Preliminary Report on Patentability rendered by the International Bureau of WIPO for PCT/EP2020/055052, dated Aug. 25, 2021, 7 pages.

(Continued)

*Primary Examiner* — Sultan Chowdhury
(74) *Attorney, Agent, or Firm* — Skaar Ulbrich Macari, P.A.

(57) ABSTRACT

An optical system includes a light guide to be worn in front of one eye, which guides light beams from the source image into the light guide and towards a reflective outcoupling arrangement, which couples the light beams out of the light guide to the eye. The outcoupling arrangement has a plurality of individual mirrors, which are spaced apart from one another in the light propagation direction. A first group of individual mirrors couples first light beams, which originate from a first imaging region, out of the light guide towards the eye, and at least one second group of individual mirrors couples second light beams, which originate from a second imaging region, out of the light guide towards the eye. The individual mirrors of the first group and the second group are each arranged alternating in the light propagation direction.

15 Claims, 3 Drawing Sheets

(58) Field of Classification Search
CPC ........ G02B 2027/011; G02B 2027/013; G02B 2027/0116; G02B 2027/0123; G02B 2027/0126; G02B 2027/0174; G02B 5/00; G02B 5/0284; G02B 5/0289; G02B 5/10; G02B 5/136
See application file for complete search history.

(56) References Cited

U.S. PATENT DOCUMENTS

| | | |
|---|---|---|
| 2015/0205138 A1 | 7/2015 | Dobschal et al. |
| 2016/0306171 A1 | 10/2016 | Rudolph et al. |
| 2016/0327789 A1* | 11/2016 | Klug .................. G02B 27/0101 |
| 2016/0357016 A1 | 12/2016 | Cakmakci et al. |
| 2017/0307895 A1 | 10/2017 | Dobschal et al. |
| 2017/0357090 A1 | 12/2017 | Martinez et al. |
| 2018/0095283 A1 | 4/2018 | Takeda et al. |
| 2018/0180884 A1 | 6/2018 | Yoshida |
| 2018/0246333 A1 | 8/2018 | Cheng et al. |
| 2018/0252941 A1 | 9/2018 | Dobschal et al. |
| 2018/0275405 A1 | 9/2018 | Dobschal |
| 2018/0348562 A1 | 12/2018 | Yoshida |
| 2020/0183169 A1* | 6/2020 | Peng .................. G02B 6/0055 |
| 2020/0192122 A1 | 6/2020 | Dobschal et al. |
| 2020/0278554 A1* | 9/2020 | Schultz .............. G02B 27/0176 |

FOREIGN PATENT DOCUMENTS

| | | |
|---|---|---|
| DE | 102016225016 A1 | 12/2017 |
| JP | 2000241751 A | 9/2000 |
| JP | 2011164545 A | 8/2011 |
| WO | 2006064301 A1 | 6/2006 |
| WO | 2016102190 A1 | 6/2016 |

OTHER PUBLICATIONS

Office Action to the corresponding Japanese Patent Application rendered by the Japan Patent Office (JPO) on Sep. 6, 2022, 5 pages (including English translation).

Office Action to the corresponding Chinese Patent Application No. 202080017754.1 rendered by the China National Intellectual Property Administration on Nov. 10, 2022, 18 pages (including English translation).

International Search Report rendered by the International Bureau of WIPO for PCT/EP2020/055052, dated Jun. 15, 2020, 3 pages.

Meng-Che Tsai et al.; Advances in Display Technologies VII; Design of an ultra-thin near-eye display with geometrical waveguide and freeform optics; Feb. 16, 2017; 8 pages.

* cited by examiner

OPTICAL SYSTEM FOR GENERATING A VIRTUAL IMAGE, AND SMARTGLASSES

PRIORITY

This application claims the priority of German patent application DE 10 2019 106 020.6, filed Mar. 8, 2019, which is hereby incorporated herein by reference in its entirety.

FIELD

The invention relates to an optical system for generating a virtual image of a source image provided by an imager arrangement, comprising at least one light guide which is to be worn in front of an eye and which is designed to guide light beams emanating from the source image and coupled into the light guide in a light propagation direction to a reflective output coupling arrangement designed to output couple the light beams from the light guide to the eye.

The invention further relates to a pair of smartglasses comprising such an optical system.

BACKGROUND

An optical system and a pair of smartglasses of the type set forth at the outset are known from the document WO 2016/102190 A1.

An optical system of the type set forth at the outset can be used in a so-called head-mounted display (HMD), i.e., a display apparatus that is worn on the head. One conventional form of HMDs uses screens that are worn in front of the eyes and present the user with computer-generated images or images taken by cameras. Such HMDs are often voluminous and do not allow direct perception of the surroundings. It is only relatively recently that HMDs have been developed which are able to present the user with an image recorded by a camera or a computer-generated image without preventing direct perception of the surroundings by way of allowing the user to gaze through the HMD. Such HMDs, which are also referred to as smartglasses, allow for this technology to be used in everyday life.

Optical systems of such smartglasses typically comprise an imager arrangement, a light guide, and an output coupling arrangement. The coupling of the light propagating in the light guide, typically by way of total-internal reflection, at the outer surfaces of the light guide out of the light guide to the eye of the user can be realized by different approaches, for example in a reflective, refractive, diffractive, holographic, etc., fashion or by a combination thereof. Smartglasses are distinguished by high demands on the imaging quality while having a relatively large field of view. At the same time, the emphasis in the case of such head-worn systems lies in a low weight and compactness (small installation space), demanding imaging of the source image on as few optical surfaces as possible for the purposes of generating the virtual image, as a result of which, in turn, only a few surfaces are available for compensating optical aberrations, however. A further demand on such smartglasses lies in the acceptance by users, which is influenced not least by the external appearance of the smartglasses. In particular, small thickness values of the light guide are desirable so that the appearance of the smartglasses does not differ substantially from conventional spectacles.

In the case of the optical system known from the document cited at the outset, the light propagating in the light guide is output coupled by way of a reflection at a contiguous free-form Fresnel surface with a plurality of reflecting Fresnel segments. As described in the document, the optical imaging quality of the optical system depends very strongly on the surface trueness and surface quality of the free-form Fresnel surface on account of the relative position of the output coupling arrangement close to the exit pupil of the optical system and close to the entrance pupil of the eye. However, a disadvantage of such a free-form Fresnel surface consists in the restricted optical imaging function of the Fresnel surfaces of the Fresnel segments and in a reduced field-of-view range or a reduced eyebox size. The eyebox is that three-dimensional region of the light tube in the imaging beam path in which the eye pupil can move, without vignetting of the image taking place. Since the distance of the eye from the smartglasses is substantially constant, the eyebox can be reduced to a two-dimensional eyebox that only takes account of the rotational movements of the eye. In this case, the eyebox substantially corresponds to the exit pupil of the smart-glasses at the location of the entrance pupil of the eye. The latter is generally given by the pupil of the eye.

The non-optimal imaging properties of the free-form Fresnel segments of the mirror sur-face are caused by the mutual discontinuous offset of the individual Fresnel surfaces in the viewing direction of the eye. This mutual discontinuous offset of the individual Fresnel segments in the viewing direction does not allow the individual Fresnel segments to be designed in such a way that sufficiently good imaging can be achieved by two adjacent Fresnel segments which contribute to the imaging of the same field point of the source image. As a result, one is forced to embody the individual Fresnel surfaces as plane mirrors only, or at best with small deviations from plane mirrors. A further disadvantage of the Fresnel segments consists in the shadow regions which are located between directly adjacent Fresnel segments and which are not provided for output coupling of used light giving rise to multiple reflections which might generate ghost images.

SUMMARY

It is an object of certain embodiments to develop an optical system of the type set forth at the outset, to the effect that the virtual image can be generated from the source image with a greater imaging quality, wherein a field of view that is as large as possible is achieved while maintaining a small installation size of the system.

According to certain embodiments of the invention, the object is achieved by virtue of the source image being provided in each case by a first imager region and at least one second imager region, adjacent to the first imager region, of the imager arrangement, by virtue of the output coup-ling arrangement comprising a plurality of individual mirrors, which in each case are arranged at a distance from one another in the light propagation direction, wherein a first group of individual mirrors output couples first light beams, which emanate from the first imager region, from the light guide toward the eye and at least one second group of individual mirrors output couples second light beams, which emanate from the at least one second imager region, from the light guide toward the eye, and by virtue of the individual mirrors of the first group and the individual mirrors of the at least one second group being arranged in alternating fashion in the light propagation direction.

Consequently, the output coupling arrangement of the optical system according to the invention comprises a plurality of individual mirrors which are each arranged at a distance from one another in the direction of light propagation in the light guide leading from the imager arrangement to the output coupling arrangement. The light propagation direction can be the horizontal direction if the optical system is worn on the head as intended. The individual mirrors are preferably embodied as separate mirrors, in particular as mini mirrors. In contrast to a free-form Fresnel mirror surface consisting of mutually linked and adjoining Fresnel segments, the configuration of the output coupling arrangement with the spaced apart individual mirrors is advantageous in that the individual mirrors can be embodied with an optically imaging power required for high imaging quality. It is even possible for the entire imaging function of the optical system to be provided by the individual mirrors. As a result, it is possible to dispense with an additional imaging optical unit, for example in the region of the imager arrangement.

Moreover, the optical system according to certain embodiments of the invention is subdivided into two or more subsystems. The source image is provided by two imager regions or, corresponding to the number of subsystems, more than two imager regions of the imager arrangement. Within the meaning of the invention, two or more imager regions is understood to mean that the source image is provided by two or more adjacently arranged imager regions of a single imager or by two or more adjacently arranged independent imagers. Here, the source image can be provided in full by each of the imager regions available, i.e., the source image is provided multiple times in accordance with the number of imager regions, or each imager region only provides individual sections of the source image which, together, yield the full source image.

In accordance with the division of the optical system into two or more subsystems, the individual mirrors of the output coupling arrangement are subdivided into two or more groups. Each group of individual mirrors is assigned to a respective imager region of the plurality of imager regions and only output couples the light beams emanating from this imager region from the light guide toward the eye. Furthermore, the individual mirrors of the two or more groups of individual mirrors are arranged in alternating fashion in the light propagation direction. This means that two individual mirrors that are immediately adjacent in the light propagation direction belong to two different groups of individual mirrors, and hence these two immediately adjacent individual mirrors output couple light beams from the light guide which emanate from two different imager regions. Since two immediately adjacent individual mirrors can generally be seen simultaneously by the eye of the user, gaps in the virtual image of the source image are consequently reliably avoided. All that needs to be ensured is that the same image impression always arises at the user, in-dependently of whether the perceived light emanates from one or the other imager region. This can be achieved in one or more of the imager regions by storage in software which ensures that the light beams emanating from the same field point of the source image are ideally overlaid on the retina in order to avoid double images and scaled distortions.

The optical system according to certain embodiments of the invention is furthermore advantageous in that each individual mirror of the plurality of groups of individual mirrors has very many degrees of freedom of the optical imaging, such as for example a large number of coefficients of a free-form polynomial and/or of an individual tilt of the individual mirror so that very good imaging quality and a lack of distortion can be attained using the optical system according to the invention.

Since the entire optically imaging power can be transferred to the individual mirrors and, moreover, it is possible to individually adapt the direction of the light guidance in the light guide by way of the alignment of the individual mirrors, it is possible to provide, with minimal outlay, a very narrow, compact HMD with a large field-of-view range. As already mentioned, the ideal case requires no further optically imaging components as required in HMDs known from the prior art, for example at the outer corners of the light guide in the vicinity of the imager.

The propagation of the light in the light guide can be implemented by reflection at opposite surfaces of the light guide. However, it is also possible within the scope of the present invention for the light beams emanating from the source image to be incident directly on the individual mirrors without a preceding reflection.

Preferred configurations of the optical system according to certain embodiments of the invention are described below.

Preferably, all or some of the individual mirrors have a curved optically imaging mirror sur-face. Many optical degrees of freedom are available for the shape of the curved optically imaging mirror surface of the individual mirrors and for the tilt of the individual mirror sur-faces, and so the optimal optical imaging quality can be attained. Thus, it is possible to embody the mirror surface of some or all of the individual mirrors as a free-form surface.

Foci of the individual mirrors preferably lie in a plane in which the source image is provided by the first or at least one second imager region. Expressed differently, the source image in this configuration is situated in the focal plane of the output coupling arrangement spanned by the foci of the individual mirrors. Consequently, the entire light beam diameter at the input coupling location of the light emanating from the source image into the light guide can be kept small. Light beams which emanate from individual field points of the source image and which are input coupled into the light guide are converted accordingly into parallel light beams by way of the individual mirrors. Then, the totality of the parallel light beams is overlaid in the exit pupil of the optical system.

Preferably, source image-side field-of-view regions of in each case two individual mirrors of the first group following one another in the light propagation direction are disjoint and source image-side field-of-view regions of in each case two individual mirrors of the at least one second group following one another in the light propagation direction are preferably likewise disjoint.

In this configuration, only discretely spaced apart source image regions of the source image are required on the respective imager region, and so the entire source image need not be provided on each imager region. Since the distances and hence the focal lengths of the individual mirrors differ in relation to the imager regions, it is advantageous if these focal length differences are stored in software on the respective imager region.

Further preferably, there is an overlap between a source image-side field-of-view region of an individual mirror of the first group and a source image-side field-of-view region of an individual mirror which belongs to the at least one second group and which is directly adjacent to this individual mirror.

As already mentioned above, storage in software in at least one of the imager regions can ensure that the light beams emanating from the two imager regions from the same field point of the source image are ideally overlaid on the retina such that double images and scale distortions are avoided.

A preferred distance between successive individual mirrors of the first group ranges between 3 mm and 5 mm, and can be for example 4 mm, in the light propagation direction.

Such a distance is matched well to the typical size of the pupil of the eye of a human adult, which is approximately 3 mm. By way of a distance in the specified range, the eye always only sees one individual mirror of each group at the same time.

A distance in the light propagation direction between an individual mirror of the first group and an individual mirror which belongs to the at least one second group and which is directly adjacent to this individual mirror preferably ranges between 1 and 3 mm.

Consequently, in the case of a typical eye pupil size of 3 mm, there always is one individual mirror from each of a plurality of different groups in a region of the light guide simultaneously captured by the eye of the user with a fixed viewing direction, and so light beams from all imager regions simultaneously contribute to the transmission of the same field point from the source image to the eye.

The individual mirrors preferably have a miniaturized embodiment and each have an edge dimension in the light propagation direction ranging from 0.5 to 2 mm. The individual mirrors can be rectangular, more particularly square, or else round. In the latter case, the edge dimension should be understood to mean the diameter of the individual mirrors. The individual mirrors can have a greater dimension than 2 mm in the direction perpendicular to the light propagation direction and parallel to the outer surfaces of the light guide, i.e., the individual mirrors can have a stripe-shaped embodiment.

A sufficiently good resolution of the image representation is generated with dimensioning of the individual mirrors as specified above. Secondly, the individual mirrors hardly impair the "see-through" function of the optical system, and so the user can easily gaze through the light guide and perceive the surroundings.

The individual mirrors can be fully reflective, having the advantage of a high contrast in the virtual image. However, the individual mirrors can also be partly reflecting and partly transmissive, which is advantageous in that the individual mirrors even less impair the perception of the surroundings through the light guide.

The individual mirrors can be realized by way of local jumps in the refractive index of the material of the light guide, rendering these partly reflective and partly transmissive. How-ever, the individual mirrors can also be realized by reflecting plate-like elements embedded in the light guide.

The output coupling arrangement can have an array of individual mirrors, wherein the array has a plurality of rows of individual mirrors, wherein each row extends in the light propagation direction and individual mirrors of the first group and individual mirrors of the at least one second group are arranged in alternating fashion in each row. As already mentioned above, a single row arrangement of stripe-shaped individual mirrors can also be chosen in place of a multi-row arrangement.

Preferably, the light guide is a spectacle lens. It is understood that such a spectacle lens may also consist of plastic.

A spectacle lens is typically curved. Without restriction, the optical system according to the invention allows the use of a curved light guide on account of the configuration of the out-put coupling arrangement with individual mirrors, as described above. Consequently, the optical system according to the invention is distinguished by being very aesthetic, contributing to the acceptance by users.

Furthermore, a pair of smartglasses having an optical system according to one or more of the above-described configurations is provided according to certain embodiments of the invention.

The smartglasses according to certain embodiments of the invention offer the same advantages and features as the above-described optical system according to the invention.

Further advantages and features are evident from the following description and the attached drawing.

It goes without saying that the aforementioned features and those yet to be explained below can be used not only in the respectively specified combination but also in other combinations or on their own, without departing from the scope of the present invention.

BRIEF DESCRIPTION OF THE DRAWINGS

An exemplary embodiment of the invention is illustrated in the drawing and described in more detail below with reference thereto. In detail.

DETAILED DESCRIPTION

Figure 1:
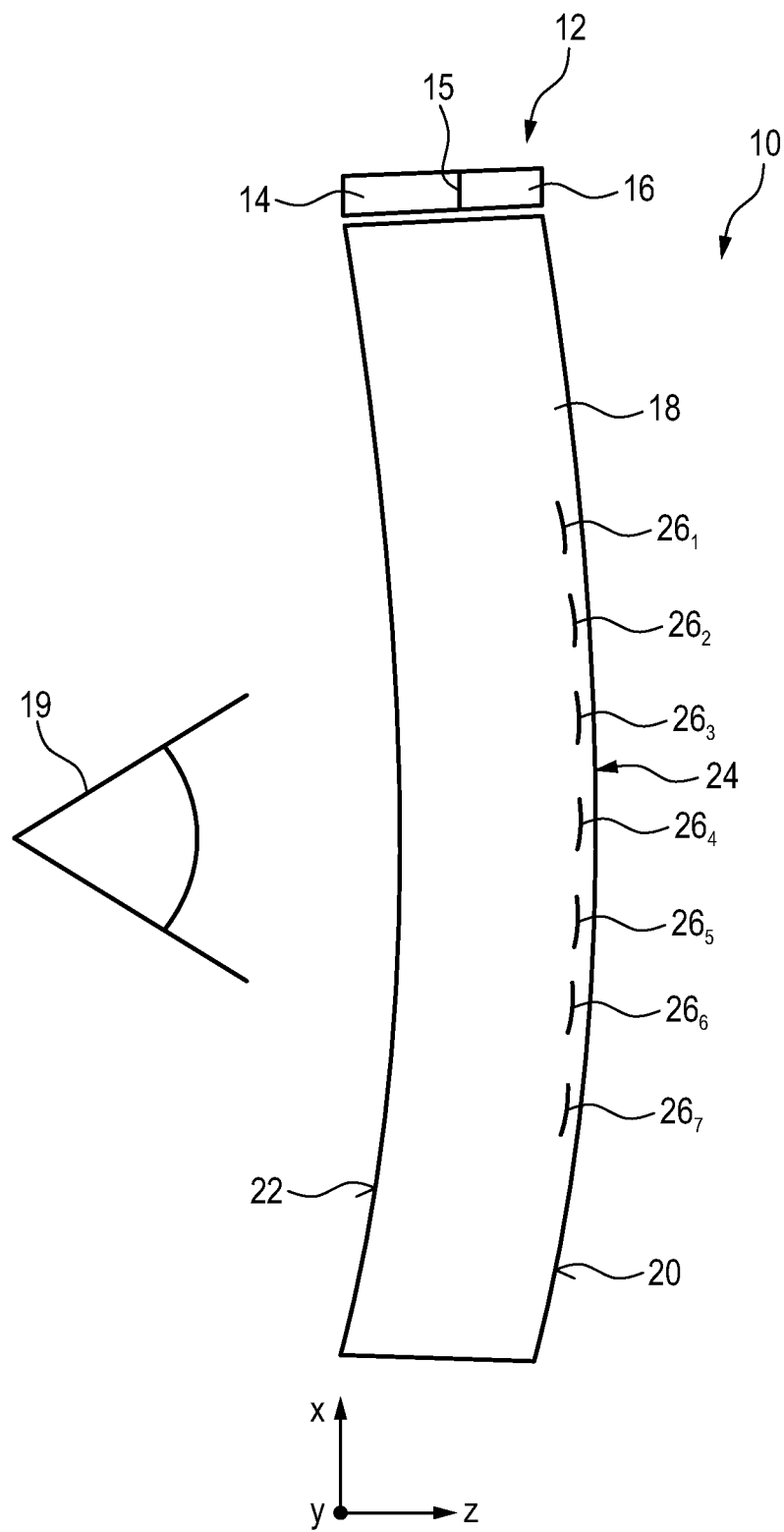
FIG. 1 shows a view from above of an optical system for generating a virtual image from a source image.

FIG. 1 shows an optical system, provided with the general reference sign 10, for generating a virtual image of a source image which is provided by an imager arrangement 12. The optical system 10 is worn on the head of a user when used as intended. FIG. 1 shows a view from above of the optical system 10 when worn on the head.

The imager arrangement 12 comprises a first imager region 14 and a second imager region 16. The first and second imager regions 14 and 16 are arranged next to one another and can be two separate displays or the two imager regions 14 and 16 can be two adjacently arranged regions of a single display. A line 15 in FIG. 1 indicates the separating line between the two imager regions 14 and 16.

The source image can be provided on the imager regions 14 and 16 as an image or video generated by a camera (not illustrated) or as a computer-generated image or video. The source image can be provided in each case as a whole, i.e., in full, on both imager regions 14 and 16 or only individual source image regions are provided on the two imagers 14 and 16 such that the union of these source image regions yields the full source image.

The optical system 10 furthermore comprises a light guide 18 into which light emanating from the source image provided by the imager regions 14 and 16 is input coupled. A light beam path to the eye of the user emanating from the imagers 14 and 16 will still be de-scribed below with reference to FIG. 3.

The light guide 18 is embodied as a spectacle lens which may be manufactured from a glass or plastic. When used as intended, the light guide 18 is worn in front of an eye 19 of the user. This is the left eye of the user in the exemplary embodiment shown. As illustrated, the light guide 18 can be curved in particular, as is likewise the case for conventional spectacle lenses.

FIG. 1 shows a view from above of the light guide 18, i.e., the upper narrow side of the spectacle lens. To ease the description, a coordinate system with a z-axis, an x-axis and a y-axis is shown in FIG. 1, the y-axis extending perpendicular to the plane of the drawing in FIG. 1. The x-axis is the light propagation direction of the light in the light guide 18 and extends in the horizontal direction when the optical system 10 is worn on the head of the user. The z-direction is the viewing direction of the eye 19 through the light guide 18. Accordingly, the y-direction denotes the vertical direction.

The light guide 18 comprises a first outer surface 20 and a second outer surface 22. When the optical system 10 is worn on the head of a user, the outer surface 20 forms the front outer surface of the light guide 18 facing away from the eye 19 and the outer surface 22 forms the back outer surface of the light guide 18 facing the eye 19 of the user.

Light emanating from the imagers 14 and 16 which is input coupled into the light guide 18 can propagate in the light guide 18 between these two outer surfaces 20 and 22, option-ally as a result of total-internal reflection at the outer surfaces 20 and 22 or without reflections. The principal propagation direction of the light (x-direction) is referred to as the light propagation of the light guide 18 in the present description.

Furthermore, the optical system 10 comprises an output coupling arrangement 24 which serves to output couple light beams emanating from the imager regions 14 and 16 which are input coupled into the light guide 18 out of the light guide 18 toward the eye 19, as will still be described below.

Figure 2:
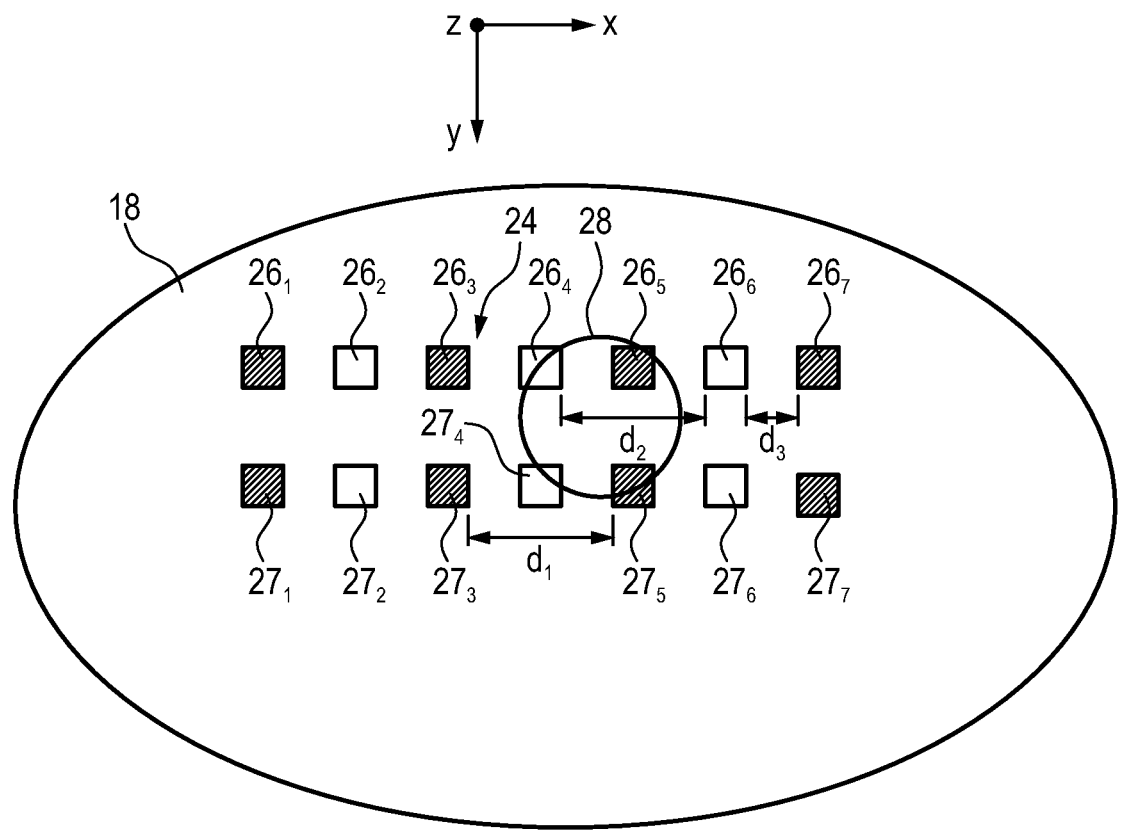
FIG. 2 shows a view from the front of the optical system.

The output coupling arrangement 24 is initially described with additional reference to FIG. 2. The imager arrangement 12 is not shown in FIG. 2.

According to FIGS. 1 and 2, the output coupling arrangement 24 comprises a plurality of individual mirrors $26_1$ to $26_7$ and $27_1$ to $27_7$. In the present description, the term "mirror" should be understood to be synonymous for the mirror surface of the mirror since the individual mirrors have neither frame nor mount. The individual mirrors $26_1$ to $26_7$ and the individual mirrors $27_1$ to $27_7$ are spaced apart from one another in each case in the light propagation direction of the light guide 18. The individual mirrors $26_1$ to $26_7$ form a first row of individual mirrors, which extend in the light propagation direction of the light guide 18, and the individual mirrors $27_1$ to $27_7$ form a second row of individual mirrors, which likewise extend in the light propagation direction of the light guide 18 and which are spaced apart from the first row of individual mirrors $26_1$ to $26_7$ perpendicular (in the y-direction) to the light propagation direction. Both the overall number of individual mirrors and the number of rows of individual mirrors should be understood to be merely exemplary here, wherein the overall number of individual mirrors can be greater than or less than the overall number shown in the drawing and provision can be made of more than or fewer than two rows of individual mirrors. By way of example, instead of a second row of individual mirrors $27_1$ to $27_7$, only one row of individual mirrors $26_1$ to $26_7$ may be present, with the individual mirrors $26_1$ to $26_7$ then preferably having a greater extent than shown in the y-direction. By way of example, the individual mirrors $26_1$ to $26_7$ can extend in the y-direction up to the point at which the lower edges (in the y-direction) of the individual mirrors $27_1$ to $27_7$ are situated in the exemplary embodiment shown.

The individual mirrors $26_1$ to $26_7$ and $27_1$ to $27_7$ are embedded in the light guide 18 and can be embodied as jumps in the refractive index of the material of the light guide 18 or, for example, as reflective plates, for example very thin metallic plates, which are embedded in the material of the light guide 18.

In accordance with the number of imagers, in this case two imager regions 14 and 16, the individual mirrors $26_1$ to $26_7$ and the individual mirrors $27_1$ to $27_7$ are divided into groups, two groups in this case. A first group of individual mirrors $26_1$, $26_3$, $26_5$ and $26_7$ and of individual mirrors $27_1$, $27_3$, $27_5$ and $27_7$ is arranged and designed to only output couple toward the eye 19 light beams emanating from one of the two imager regions 14 or 16 out of the light guide 18 and a second group of individual mirrors $26_2$, $26_4$, $26_6$ and of individual mirrors $27_2$, $27_4$, $27_6$ is designed to only output couple toward the eye light beams emanating from the other one of the two imager regions 14 and 16. To make the distinction easier, the individual mirrors $26_1$, $26_3$, $26_5$, $26_7$ and $27_1$, $27_3$, $27_5$, $27_7$ of the first group are illustrated with hatching and the individual mirrors $26_2$, $26_4$, $26_6$ and $27_2$, $27_4$, $27_6$ of the second group are illustrated in white.

As emerges from FIG. 2, individual mirrors of the first group of individual mirrors alternate in the light propagation direction of the light guide 18 (x-direction) with individual mirrors of the second group of individual mirrors. Hence, immediately adjacent individual mirrors, for example the individual mirrors $26_6$ and $26_7$, belong to two different groups of individual mirrors in each case.

A spacing $d_1$ between successive individual mirrors $27_1$, $27_3$, $27_5$, $27_7$ of the first group in the light propagation direction of the light guide 18, as shown for the individual mirrors $27_3$ and $27_5$, ranges between 3 mm and 5 mm and is 4 mm, for example. The spacing $d_1$ is equal to or greater than the size of the eye pupil of an adult human, which is approximately 3 mm. A spacing $d_2$ between successive individual mirrors $26_2$, $26_4$, $26_6$ or $27_2$, $27_4$, $27_6$ of the second group in the light propagation direction of the light guide 18, as shown for the individual mirrors $26_4$ and $26_6$, likewise ranges between 3 mm and 5 mm and is 4 mm, for example.

A distance $d_3$ in the light propagation direction between a respective individual mirror of the first group and an individual mirror which belongs to the at least one second group and which is directly adjacent to this individual mirror, as shown for the individual mirrors $26_6$ and $26_7$, ranges between 1 and 3 mm and is 2 mm, for example.

A circular line 28 in FIG. 2 indicates the area of the output coupling arrangement 24 which is captured at the same time by the eye 19 with a pupil size of approximately 3 mm in the case of a fixed viewing direction (z-direction). Consequently, the diameter of this region indicated by the circular line 28 is smaller than the distance $d_2$ or $d_1$ between adjacent individual mirrors of the same group. Thus, the eye 19 does not simultaneously see two successive individual mirrors of the same group in the light propagation direction of the light guide 18 but can and will, as a rule, simultaneously see two immediately adjacent individual mirrors from different groups.

In FIG. 2, the individual mirrors $26_1$ to $26_7$ and $27_1$ to $27_7$ are shown as square individual mirrors, with this however only being exemplary. In general, the individual mirrors can also have a polygonal or round embodiment. The size of the individual mirrors can be miniaturized, for example ranging between 0.5 and 2 mm, with this being understood to mean an edge dimension of the individual mirrors in the light propagation direction. By way of ex-ample, the individual mirrors $26_1$ to $26_7$ and $27_1$ to $27_7$ each have an edge dimension of 1 mm in the light propagation direction. They can have a larger dimension in the y-direction, particularly if only one row of individual mirrors is present.

Figure 3:
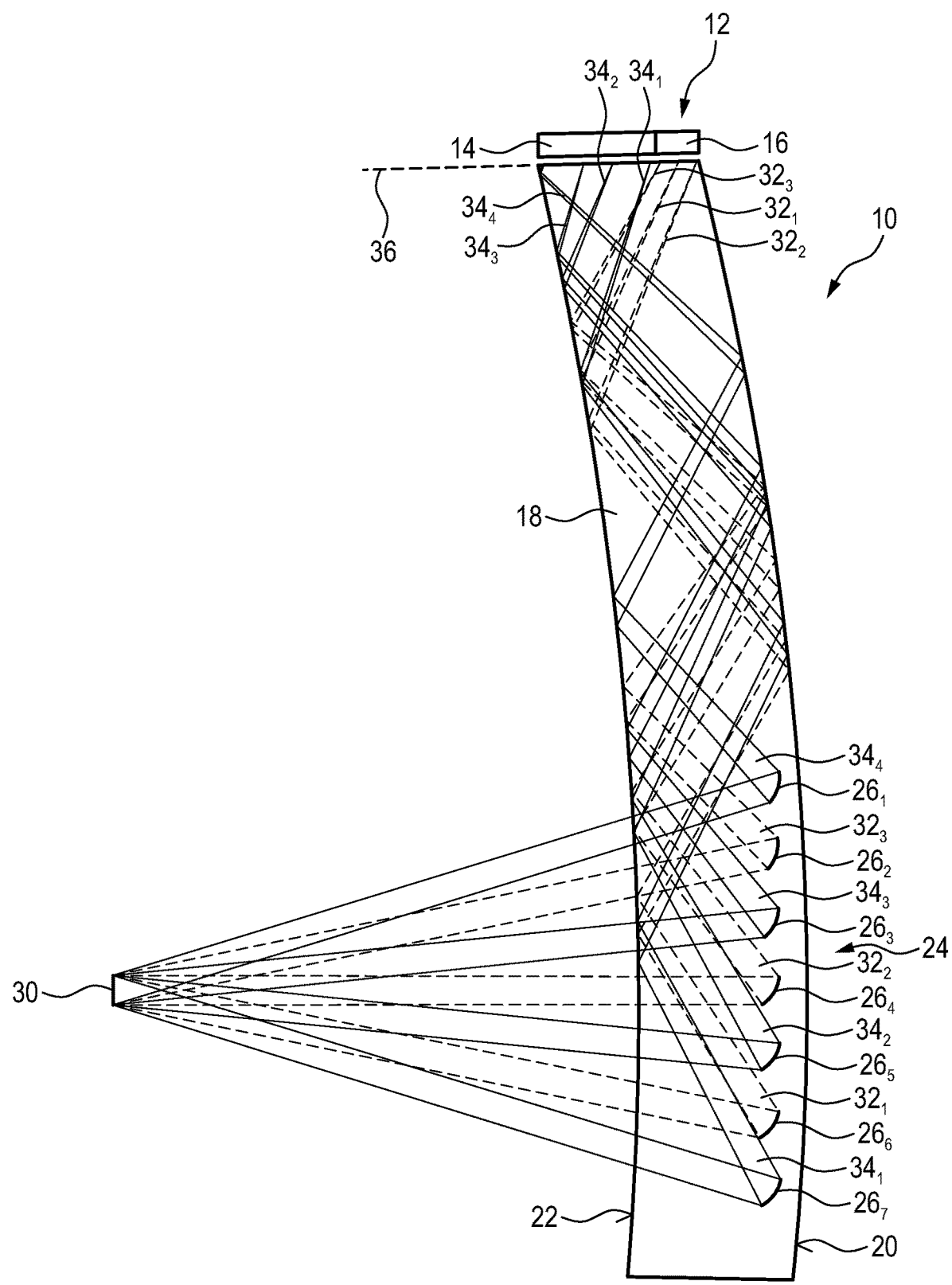
FIG. 3 shows a further view from above of the optical system in FIG. 1 with a light beam path.

Further details of the optical system 10 are additionally described with reference to FIG. 3. FIG. 3 shows an overall light beam path emanating from the imager regions 14 and 16 to an exit pupil 30 of the optical system 10. If the optical system 10 is worn on the head of a user, the exit pupil 30 approximately coincides with the entrance pupil or the eyebox of the eye 19 (FIG. 1) of the user. The user sees a virtual image of the source image which appears to be overlaid beyond the outer surface 20 of the light guide 18 with the actually perceived surroundings.

FIG. 3 shows seven light beams in exemplary fashion, wherein light beams $32_1$, $32_2$ and $32_3$ which emanate from the imager region 16 are represented by dashed lines and wherein light beams $34_1$, $34_2$, $34_3$, $34_4$ which emanate from the imager region 14 are shown using full lines.

Having been coupled into the light guide 18 after emanating from the source image provided by the imager regions 14 and 16, the light beams $32_1$ to $32_3$ and $34_1$ to $34_4$ are guided in the light guide 18 in the light propagation direction of the light guide 18 under re-flection, in particular total-internal reflection, at the outer surfaces 20 and 22 to the output coupling arrangement 24 in the exemplary embodiment shown. The light beams $32_1$, $32_2$, $32_3$ emanating from the imager region 16 are then incident on the individual mirrors $26_6$, $26_4$, $26_2$ of the second group of individual mirrors. The light beams $34_1$, $34_2$, $34_3$, $34_4$ emanating from the imager region 14 are incident on the individual mirrors $26_7$, $26_5$, $26_3$, $26_1$ of the first group of individual mirrors. The individual mirrors $27_1$ to $27_7$ cannot be seen in FIG. 3; however, the same applies as for the individual mirrors $26_1$ to $26_7$. In other embodiment variants, individual light beams or all light beams $32_1$ to $32_3$ and $34_1$ to $34_4$ can be incident directly on the individual mirrors after being input coupled into the light guide 18, without this being preceded by one or more deflections by way of reflection.

If the light beams $32_1$ and $34_1$, which emanate from at least approximately the same field points of the source image from the imager region 14 and from the imager region 16 are considered, these light beams are incident on directly adjacent individual mirrors $26_6$ and $26_7$, the latter belonging to different groups of individual mirrors as described above. The two individual mirrors $26_6$ and $26_7$ are located within an area of the light guide 18 that is captured simultaneously by the eye 19 of the user, as already described above with reference to the circular line 28 in FIG. 2. Storage in software at one or both of the imager regions 14 or 16 can ensure that the light beams emanating from the same field point of the source image are ideally overlaid on the retina of the eye in order to avoid double images and scale distortions.

As indicated in FIG. 3, the individual mirrors $26_1$ to $26_7$ (just like the individual mirrors $27_1$ to $27_7$) each have a curved optically imaging mirror surface. In particular, all individual mirrors can be embodied with a curved optically imaging mirror surface. The mirror surface of the individual ones or all of the individual mirrors $26_1$ to $26_7$ and $27_1$ to $27_7$ can be embodied as free-form surface. On account of the configuration of the output coupling arrangement 24 with individual mirrors, there is a very large range of degrees of freedom for the optical imaging in the optical design of the individual mirrors, and so the quality of the virtual image generated from the source image can be optimized.

As emerges further from FIG. 3, foci of the individual mirrors $26_1$ to $26_7$ lie in the plane 36 of the source image (the same applying to the individual mirrors $27_1$ to $27_7$). Since the distances and hence the focal lengths of the individual mirrors differ in relation to the imager regions 14 and 16, it is advantageous if these focal length differences are stored in soft-ware on the respective imager region 14 and/or 16.

On account of the distance $d_1$ or $d_2$ in the light propagation direction between successive individual mirrors of the same group, which is chosen to be equal to or greater than the pupil size of the eye pupil, source image-side field-of-view regions of in each case two individual mirrors of the same group following one another in the light propagation direction are disjoint. By contrast, there is an overlap between source image-side field-of-view regions of immediately adjacent individual mirrors belonging to the first and the second group. As already mentioned previously, storage in software on one of the imagers 14 and 16 can ensure that these field-of-view regions which are captured simultaneously by the eye 19 of the user are optimally overlaid in the exit pupil 30.

On account of the configuration of the output coupling arrangement 24 by way of a multiplicity of individual mirrors $26_1$ to $26_7$ and $27_1$ to $27_7$, these individual mirrors preferably develop the entire optical imaging effect for generating the virtual image from the source image.

The individual mirrors $26_1$ to $26_7$ and $27_1$ to $27_7$ can be fully reflective or partly reflective/partly transmissive to light in the visible spectrum. The "see-through" function of the optical system 10 is ensured both in the case of a fully reflective and in the case of a partly reflective/partly transmissive configuration of the individual mirrors.

In one example, the light guide 18, which can be embodied as a spectacle lens, has a thickness (in the z-direction) of approximately 5 mm. By way of example, the light guide 18 can have a radius of curvature of 100 mm. These parameters allow attainment of a field of view of the optical system 10 of 45° in the horizontal direction, which is already very good.

It is understood that the illustrations in FIGS. 1, 2 and 3 are substantially magnified. In practice, the extent of the light guide 18 overall corresponds to the extent of a usual spectacle lens.

Furthermore, the optical system 10 may not only be subdivided into two partial systems with two imager regions and two groups of individual mirrors as shown in the drawing, but it may also be subdivided into three or more partial systems with a corresponding number of imager regions and groups of individual mirrors.

The optical system 10 is preferably embodied as a pair of smartglasses or a pair of smart-glasses comprises such a system 10.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An optical system for generating a virtual image of a source image provided by an imager arrangement, comprising:
   a light guide, which is configured to be worn in front of an eye and guide light beams emanating from the source image and coupled into the light guide in a light propagation direction to a reflective output coupling arrangement, the output coupling arrangement configured to output couple the light beams from the light guide toward the eye, wherein the source image is provided in each case by a first imager region and at least one second imager region, adjacent to the first imager region, of the imager arrangement, wherein the output coupling arrangement comprises a plurality of individual mirrors, each of which are arranged at a distance from one another in the light propagation direction, wherein a first group of individual mirrors output couples first light beams, which emanate from the first imager region, from the light guide toward the eye, and at least one second group of individual mirrors output couples second light beams, which emanate from the at least one second imager region, from the light guide toward the eye, and wherein the individual mirrors of the first group and the individual mirrors of the at least one second group are arranged in alternating fashion in the light propagation direction.

2. The optical system of claim 1, wherein the individual mirrors comprise a curved optically imaging mirror surface.

3. The optical system of claim 2, wherein the mirror surface of the individual mirrors comprises a free-form surface.

4. The optical system of claim 2, wherein foci of the individual mirrors lie in a plane in which the source image of the first imager region or the at least one second imager region is provided.

5. The optical system of claim 1, wherein source image-side field-of-view regions of in each case two individual mirrors of the first group following one another in the light propagation direction are disjoint, and wherein source image-side field-of-view regions of in each case two individual mirrors of the at least one second group following one another in the light propagation direction are disjoint.

6. The optical system of claim 1, wherein a source image-side field-of-view region of an individual mirror of the first group overlaps a source image-side field-of-view region of an individual mirror which belongs to the at least one second group and which is directly adjacent to the individual mirror of the first group.

7. The optical system of claim 1, wherein a distance between successive individual mirrors of the first group ranges between 3 mm and 5 mm in the light propagation direction.

8. The optical system of claim 1, wherein a distance between an individual mirror of the first group and an individual mirror which belongs to the at least one second group, and which is directly adjacent to the individual mirror of the first group, ranges between 1 mm and 3 mm.

9. The optical system of claim 1, wherein the individual mirrors each have an edge dimension in the light propagation direction ranging between 0.5 mm and 2 mm.

10. The optical system of claim 1, wherein the individual mirrors are fully reflective.

11. The optical system of claim 1, wherein the individual mirrors are partly reflective and partly transmissive.

12. The optical system of claim 1, wherein the output coupling arrangement comprises a plurality of rows of individual mirrors, wherein each of the plurality of rows extends in the light propagation direction, and wherein individual mirrors of the first group and individual mirrors of the at least one second group are arranged alternatingly in each row.

13. The optical system of claim 1, wherein the light guide comprises a spectacle lens.

14. The optical system of claim 13, wherein the spectacle lens is curved.

15. A pair of smartglasses, comprising the optical system of claim 1.

* * * * *